T. G. Hall.
Nippers.
No 64,664.  Patented May 14, 1867.

Witnesses:
J. A. Service
Wm Trewin

Inventor:
Thomas G. Hall
Per Munn & Co
Attorneys

United States Patent Office.

THOMAS G. HALL, OF NEW YORK, N. Y., ASSIGNOR TO HIMSELF AND C. E. McDONALD, OF BROOKLYN, NEW YORK; SAID C. E. McDONALD ASSIGNOR TO E. HARRY GIFFORD, OF BROOKLYN, NEW YORK.

*Letters Patent No. 64,664, dated May 14, 1867.*

IMPROVED NIPPERS.

The Schedule referred to in these Letters Patent and making part of the same.

TO ALL WHOM IT MAY CONCERN:

Be it known that I, THOMAS G. HALL, of the city, county, and State of New York, have invented a new and useful improvement in Nippers; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a pair of nippers, the movable jaw of which is secured to one end of a lever, the other end of which is acted upon by a toe attached to the inner end of the appropriate handle in such a manner that a great leverage is effected, and the operation of the nippers in cutting wire or other articles is materially facilitated. The stationary jaw is secured to the end of its handle by a dove-tail and screw, so that the same can be readily taken off for the purpose of sharpening, or that it can be replaced when worn out. A suitable set-screw prevents the cutting edges of the two jaws from overlapping, or from being forced too close.

Figure 1:
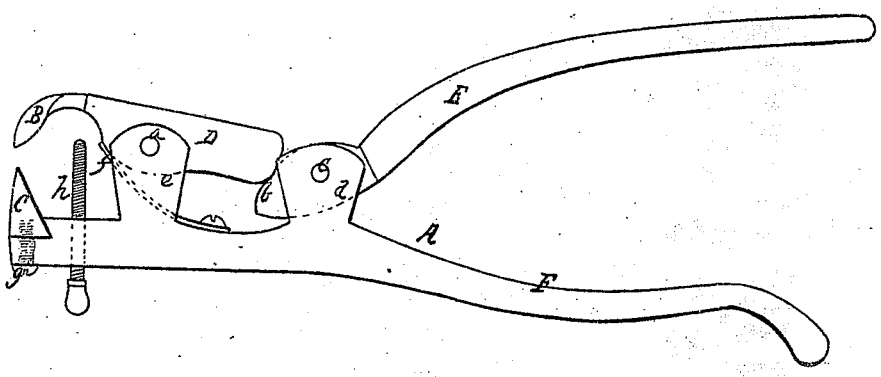
Figure 1 represents a side elevation of this invention.
Figure 2:
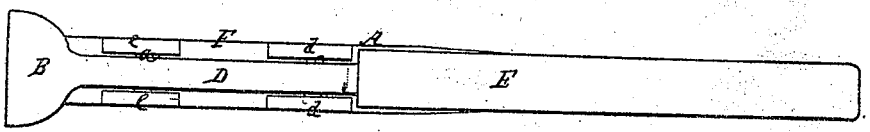
Figure 2 is a plan or top view of the same.

A represents a pair of nippers, which are composed of a movable jaw, B, and a stationary jaw, C. The movable jaw is secured to the outer end of a lever, D, which has its fulcrum on a pivot, $a$, secured in two lugs or ears, $e$, which rise from the shank or handle F of the stationary jaw. The inner end of this lever is acted on by a toe, $b$, formed at the end of the handle E, which has its fulcrum on a pivot, $c$, in the lugs or ears $d$, which rise from the handle F at some distance from the lugs or ears $e$. A spring, $f$, keeps the inner end of the lever D in contact with the toe $b$, as shown in fig. 1 of the drawing, and by these means the jaw B is thrown open. The stationary jaw C is fitted into a V-shaped or dove-tailed recess in the end of its handle F, and it is retained in position by a screw, $g$. By taking out this screw, the jaw can be readily removed for the purpose of sharpening, or when worn out it can be easily replaced by another. A set-screw, $h$, prevents injury to the cutting-edges in case undue pressure should be applied to the handles, whereby, if the set-screw should be omitted, said cutting-edges would be liable to be forced too close together, or caused to overlap each other, and to get broken. By the combination of the lever D, toe $b$, and handle F, an immense power can be brought to bear on the jaw B, and the operation of cutting wire or other articles is materially facilitated.

Having thus described my invention, I claim as new, and desire to secure by Letters Patent—

The lever D, handles E and F, toe $b$, spring $f$, jaws B C, set-screw $h$, constructed, arranged, and operating substantially as and for the purpose described.

The above specification of my invention signed by me this 5th day of November, 1866.

THOMAS G. HALL.

Witnesses:
WM. F. McNAMARA,
W. HAUFF.